United States Patent [19]

Pichler et al.

[11] Patent Number: 4,808,772
[45] Date of Patent: Feb. 28, 1989

[54] CABLE JOINT WITH END BODIES AND A LONGITUDINALLY SLOTTED SLEEVE

[75] Inventors: Klaus Pichler, Otterfing; Dieter Kunze, Neuried; Jan Rost, Traubing; Wolfgang Haeder, Eichenau, all of Fed. Rep. of Germany

[73] Assignee: Siemens Aktiengesellschaft, Berlin and Munich, Fed. Rep. of Germany

[21] Appl. No.: 132,429

[22] Filed: Dec. 14, 1987

Related U.S. Application Data

[62] Division of Ser. No. 918,471, Oct. 14, 1986, Pat. No. 4,733,019.

[30] Foreign Application Priority Data

Oct. 14, 1985 [DE] Fed. Rep. of Germany ....... 3536599

[51] Int. Cl.⁴ .................................. H02G 15/113
[52] U.S. Cl. ...................... 174/92; 174/77 R; 174/93
[58] Field of Search ................ 174/77 R, 92, 93

[56] References Cited

U.S. PATENT DOCUMENTS

| 3,663,740 | 4/1972 | Dellett | 174/92 |
| 4,087,190 | 5/1978 | Haeder | 24/25 |
| 4,103,911 | 8/1978 | Giebel et al. | 174/21 R X |
| 4,181,814 | 1/1980 | Smith | 174/92 |
| 4,262,167 | 4/1981 | Bossard et al. | 174/92 |
| 4,558,174 | 12/1985 | Massey | 174/92 |
| 4,570,032 | 2/1986 | Charlebois et al. | 174/93 X |
| 4,733,019 | 3/1988 | Pichler | 174/92 |

FOREIGN PATENT DOCUMENTS

| 2158993 | 5/1973 | Fed. Rep. of Germany | 174/92 |
| 2158992 | 5/1973 | Fed. Rep. of Germany | 174/92 |
| 2304852 | 8/1974 | Fed. Rep. of Germany | 174/92 |
| 3345932 | 6/1985 | Fed. Rep. of Germany | 174/92 |
| 1147778 | 6/1957 | France | 174/92 |
| 474440 | 9/1952 | Italy | 174/92 |

Primary Examiner—Morris H. Nimmo
Attorney, Agent, or Firm—Hill, Van Santen, Steadman & Simpson

[57] ABSTRACT

A cable joint comprising a pair of end bodies and a longitudinally slotted sleeve which is secured on the end bodies with a sealing system arranged therebetween characterized by the sealing system having two annular portions and at least one longitudinal portion and an arrangement for clamping the sleeve in sealing engagement on the end bodies. Preferably, the sealing system is reusable and the assembly can be accomplished with ordinary tools such as a screwdriver. In one embodiment, the annular portions are separate from the longitudinal portions. In another embodiment, a single ring-shaped element forms both the annular portions and the two longitudinal portions.

23 Claims, 13 Drawing Sheets

FIG 4
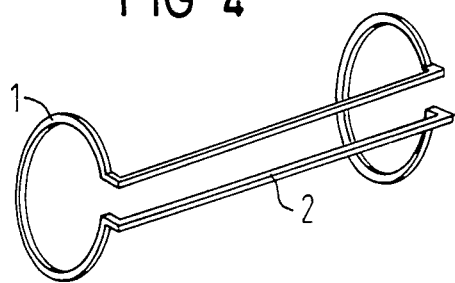
FIG 5
FIG 6
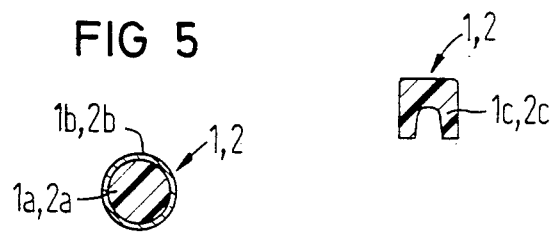
FIG 7
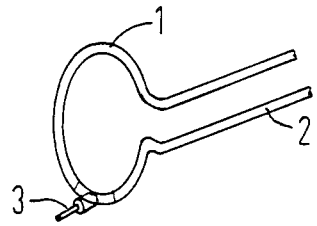
FIG 8
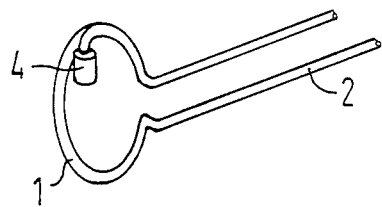

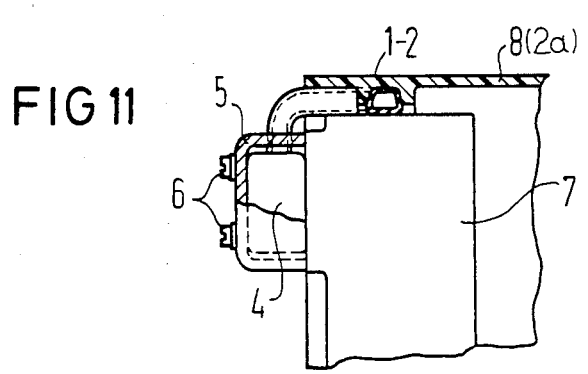
FIG 11
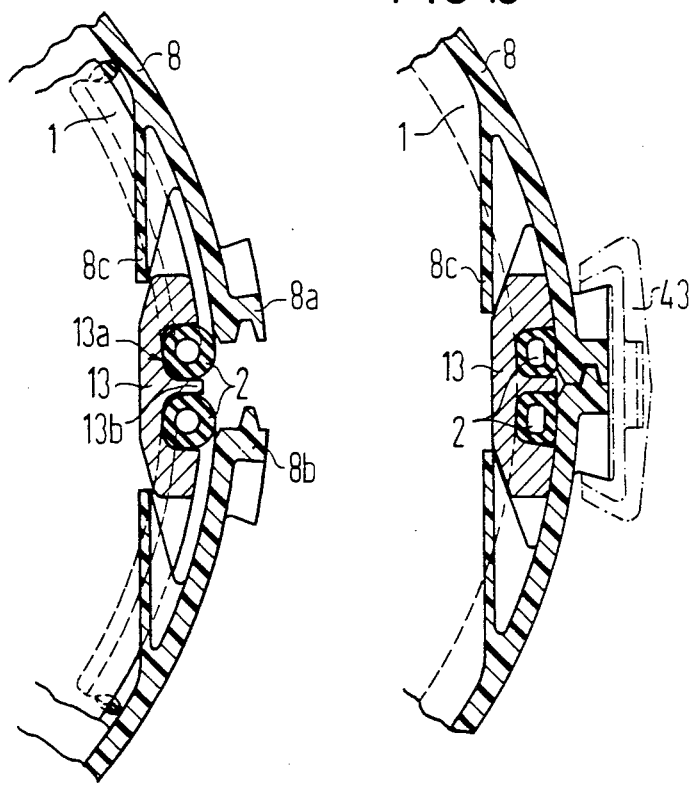
FIG 12
FIG 13

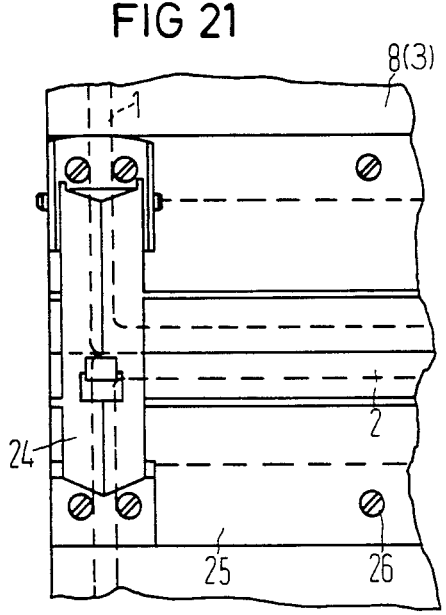
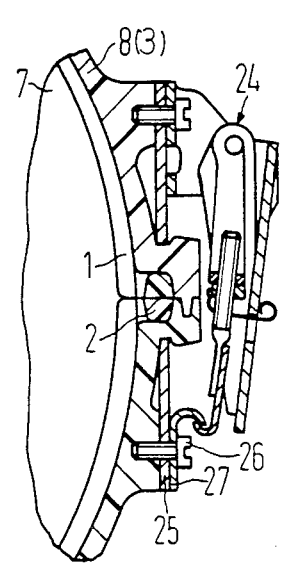
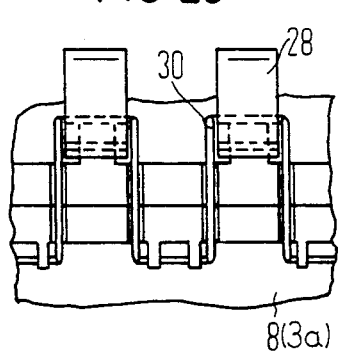
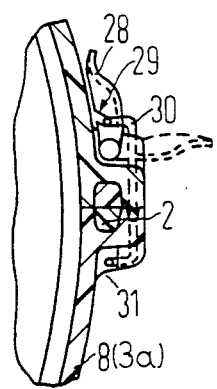
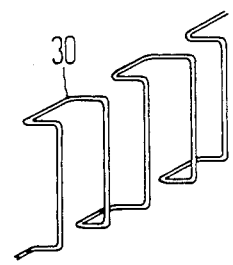

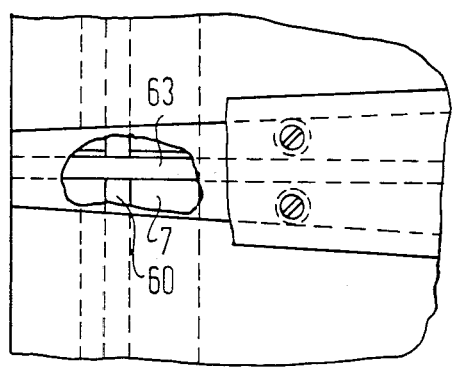
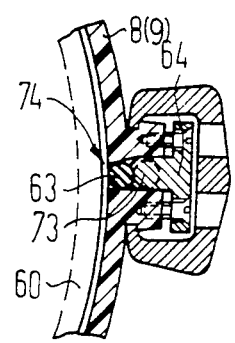
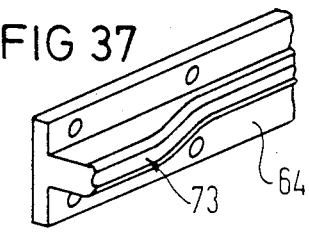
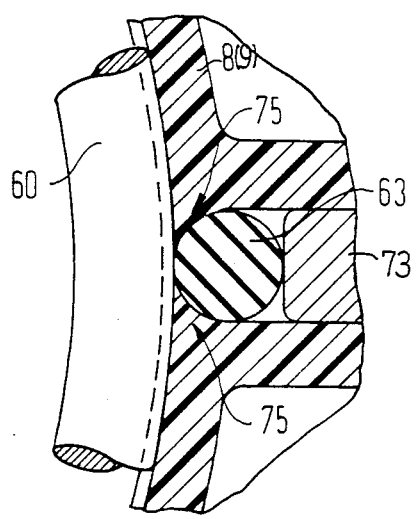
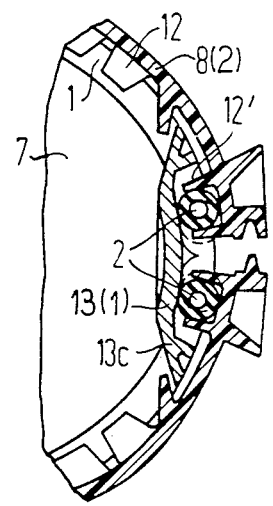

CABLE JOINT WITH END BODIES AND A LONGITUDINALLY SLOTTED SLEEVE

RE-ELECTED APPLICATION

This is a divisional application of application Ser. No. 918,471, filed Oct. 14, 1986, which issued on Mar. 22, 1988 as U.S. Pat. No. 4,733,019.

BACKGROUND OF THE INVENTION

The present invention is directed to a cable joint with end bodies having sealing glands for cables to extend through and a sleeve having a longitudinally extending slot which is wrapped around the spaced apart end bodies with a sealing system interposed therebetween to seal the longitudinal slot and the junctions between the sleeve and each of the end bodies.

A cable joint having a pair of end bodies coacting with a sleeve having a longitudinal slot is disclosed in German patent No. 2,427,677 and in U.S. Pat. No. 4,103,911. In these patents, the end bodies are formed by joined together members, which have cable inlet openings which can be adapted to the size of the cable which is to be utilized. In the assembled state, the end bodies are provided at their outer peripheral surface with the sealing means and a sleeve having a longitudinally extending slot is clamped thereon. Along the longitudinal slot, the sleeve has, for example, clamping closure elements which consist of wedge-shaped beads or flanges along the slot which receive a matching, clamping bar that is drawn on the beads to urge them to a closed and sealing position. An example of such a clamping bar is disclosed in U.S. Pat. No. 4,087,190, which is based on German Gebrauchmuster 7,620,440. In cable joints of this kind, particularly in large embodiments, considerable closing forces are necessary which in addition to requiring special tools also require special care when forming the seal between the various components.

SUMMARY OF THE INVENTION

The object of the present invention is to improve upon the cable joints of the above described types in such a manner that the assembly at a location does not require special tools and where both in general and in particular in respect to the sealing inserts, the assembly is to simplified.

The object is obtained by an improvement in a cable joint having a pair of end bodies with sealing glands for openings receiving the cable, a sleeve having a longitudinally extending slot with edge portions, said sleeve being wrapped around the spaced end body and held thereon by clamping means engaging closure elements disposed along the edges of the slot. The improvement comprising a sealing system having annular portions for forming a seal between each of the end bodies and the sleeve and a longitudinal portion for forming a seal at said slot, said portions being of an elastic material and being sufficiently flexible to be positioned on the end bodies and at the slot prior to assembly of the sleeve on the end bodies so that the closing means and the closure elements are constructed to maintain the necessary closing pressure and to be assembled on the joint by means of conventional tools.

In the exemplary embodiments in accordance with the present invention, the sealing system has the annular portions positioned between the peripheral surface of each of the end bodies and the sleeve and also has a longitudinally extending portion positioned to seal the longitudinal slot with these portions consisting of elastic material. In comparison to previous bonded sealing inserts, the structure provides easier assembly conditions and the advantage consists, in particular, that these sealing portions can be reused. This means that when it is necessary to open the cable joint, it can be reclosed in accordance with the present invention without additional means or replacing sealing material. Furthermore, the sealing system along the slot in the sleeve is matched to the sealing elements in respect to shape, elasticity and fixing in such a manner that it is unnecessary to use special tools. Opening and also subsequent reclosing of the sleeve thus does not necessitate special measures and therefore, these procedures can be carried out without problems. The closing elements which are used in combination with the sealing elements in accordance with the invention require, for example, only a conventional screw driver which is available in all tool kits. The sealing elements or portions themselves are easily fixed with ease of assembly in the individual sleeve elements so that no special skills or manual measures are required.

All the described variations of the exemplary embodiments are based on this described aim which is fulfilled by the principles in accordance with this invention. Other advantages and features will be readily apparent from the following description, drawings and claims.

BRIEF DESCRIPTION OF THE DRAWINGS

FIG. 4 is a perspective view of one embodiment of the sealing system in accordance with the present system;

FIG. 5 is a cross sectional view of a portion of the sealing system in accordance with the present invention;

FIG. 6 is a cross sectional view of a modification of a portion of a sealing system in accordance with the present invention;

FIG. 7 is a partial perspective view of another modification of the sealing system in accordance with the present invention;

FIG. 8 is a partial perspective view of another modification of the sealing system in accordance with the present invention;

FIG. 11 is a partial cross sectional view with portions in elevation for purposes of illustration of an embodiment of the cable joint utilizing the sealing system of FIG. 8;

FIG. 12 is a cross sectional view taken along lines XII—XII of FIG. 1 illustrating the sealing system with the cable sleeve partially opened;

FIG. 13 is a cross sectional view of the system of FIG. 12 in the closed position;

FIG. 20 is a transverse cross sectional view taken along line XX—XX of of FIG. 2 illustrating a modification of the sealing system and the clamping arrangement in accordance with the present invention;

FIG. 21 is a partial plan view of the clamping arrangement of FIG. 20;

FIG. 22 is a partial transverse cross sectional view of the longitudinal sealing portion showing a modification of the clamping arrangement;

FIG. 23 is a partial plan view of the clamping arrangement of FIG. 22;

FIG. 24 is a perspective view of the clamping wire utilized in the clamping arrangement of FIG. 22;

FIG. 34 is an enlarged partial transverse cross sectional view of a longitudinal seal adjacent the annular sealing portion modification of the present invention;

FIG. 35 is a plan view of the intersection of the longitudinal and annular seals with portions broken away for purposes of illustration;

FIG. 36 is a partial transverse cross sectional view similar to FIG. 34 illustrating the clamping elements in accordance with the present invention;

FIG. 37 is a perspective view of a spring element used in the embodiment of FIG. 36 in accordance with the present invention;

FIG. 38 is a partial transverse cross sectional view taken along line XXXVIII—XXXVIII of FIG. 3;

DESCRIPTION OF THE PREFERRED EMBODIMENTS

Figure 1:
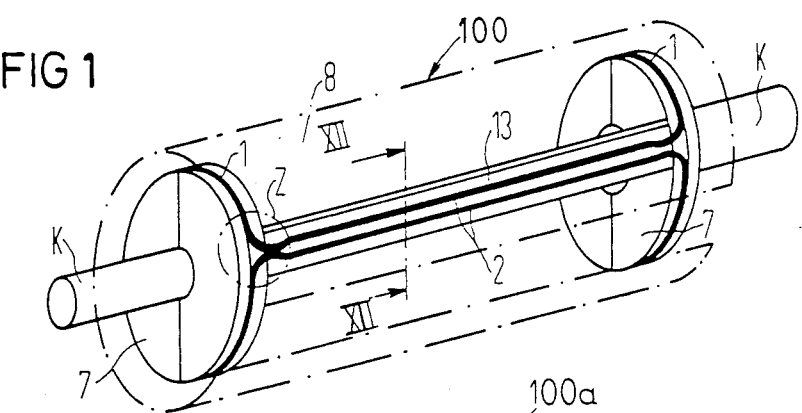
FIG. 1 is a diagramatic perspective view of a cable joint in accordance with the present invention.

The principles of the present invention are particularly useful in a cable joint generally indicated at 100 in FIG. 1. The cable joint 100 has a pair of end bodies 7, which are spaced apart by a connecting bar 13, and a sleeve 8, which has a longitudinally extending slot and is wrapped and held tightly therearound. To provide a water-tight seal both for the engagement between the sleeve 8 and each of the end bodies 7 and the longitudinally extending slot of the sleeve, a sealing system having annular or end portions 1 and two horizontal or longitudinal portions 2 is provided. As illustrated in FIG. 1, the sealing system has the portions 1 and 2 interconnected as a single, continuous ring-shaped member to form an endless sealing element. This endless sealing element is positioned with the annular portions 1 being received in peripheral grooves in each of the bodies 7 and the longitudinal extending portions 2 being positioned on the connecting bar 13 which is formed of a impervious material. Thus, by positioning of the sleeve 8 wrapped onto the end bodies 7 with the edges forming the slot positioned over the horizontal portions 2, and by clamping the sleeve in this position, a water-tight seal is obtained. In this arrangement, the connecting bar 13, which was originally provided to hold the two end bodies 7 at the desired spacing, now simultaneously is used as a support for the longitudinal extending seal portions 2. Each of the end bodies 7 are formed of two members joined together to form a sealing engagement with a cable K, which is to extend through an opening therein. The end bodies 7 can have structure of the various modifications, that is disclosed in U.S. Pat. No. 4,103,911, whose disclosure is incorporated by reference thereto.

Figure 2:
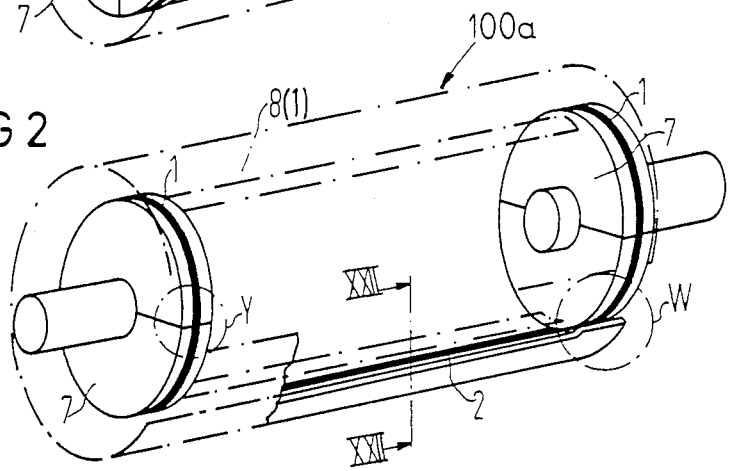
FIG. 2 is a diagramatic perspective view of an embodiment of the cable joint in accordance with the present invention.

A second embodiment of the cable joint is generally indicated at 100a in FIG. 2. This embodiment includes a pair of end bodies 7 and a sleeve 8(1). In this embodiment, the sealing system has the two annular sealing portions 1 and at least one longitudinal sealing portion 2 which are separate units or elements with the annular sealing portions 1 being disposed on the peripheral surface of the split end bodies 7 and a longitudinal portion 2 being fixed on one of the two longitudinal edges of the sleeve 8(1). Thus, the sleeve can be supplied as a cohesive, individual component. This arrangement obviates the need for the assembly work present in the embodiment of FIG. 1. Since, as already mentioned, the sealing portion 1 and 2 consist of elastic material, the joint body can be repeatedly opened and closed using the sealing system.

Figure 3:
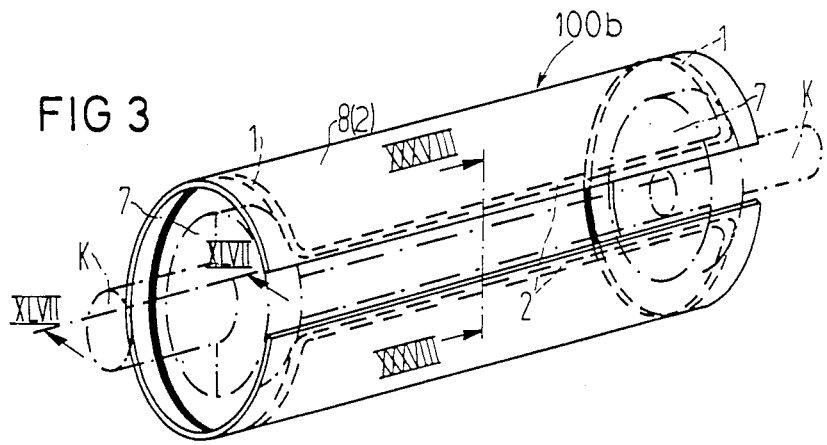
FIG. 3 is a diagramatic perspective view of a third embodiment of the cable joint of the present invention.

A third embodiment of the cable joint system is generally indicated at 100b in FIG. 3. In the third embodiment, the sealing system again has annular and longitudinal portions 1 and 2 which are formed of continuous, single ring-shape elements and these are carried on a split sleeve 8(2). As in the embodiment of FIG. 1, a connecting bar or member can be provided for spacing the two end bodies 7 and for acting with the horizontal portions 2 and forming the seal. This arrangement will be discussed later on with regard to FIG. 38.

The sealing system of the embodiment 100 of FIG. 1 and the embodiment 100b of FIG. 3 have the annular portions 1 interconnected to the horizontal or longitudinal extending portions 2 as best illustrated in FIG. 4. As illustrated, the two annular portions 1 are at the end and are interconnected by two parallel longitudinally extending portions 2. The shape can be inserted in a particularly simple manner into the sealing grooves of already assembled end bodies of the cable joint and simultaneously positioning of the longitudinal seals will also occur and can be inserted in the provided sealing zone, for example, of the exemplary embodiments shown in FIGS. 1 and 3. The insertion operation is simple and no incisions are necessary.

The sealing system of FIG. 4 can have various different constructions as far as cross sections. As illustrated in FIG. 5, the portions 1 and 2 have an elastic base core 1a or 2a, which is formed of a silicone-rubber and is provided with an additional coating 1b or 2b consisting of a suitable material for permeation protection, for example an elastomer coating. This cross sectional shape can be virtually, arbitrarily varied although it must correspond to the profile of the sealing zone. Thus, rectangular cross sections with or without curved surfaces can also be utilized as are double profiles and the like. However, the base material for the sealing element is of essential importance and an example of the exemplary embodiments in accordance with the present invention preferably consist of an elastomer. This applies to all of the following described sealing elements.

A modification of the cross section of the sealing element is illustrated in FIG. 6. In this modification, both the annular and longitudinal portions 1 and 2 have a rectangular or box-shaped cross section with a groove extending along one side to form two spaced sealing lips 1c or 2c. The provision of the sealing lips makes the sealing element rendered softer and more adaptable to forming a seal.

It is also possible to use a tubular element for the sealing portions 1 and 2. If the interior of a tubular sealing element is supplied with internal pressure, it will become more adapted to a particular sealing condition. In this way, the closing pressure necessary for the sealing process can be set extremely accurately and easily and the closing elements of the closure system can be designed to be correspondingly of a simpler construction since the necessary closing pressure need not be applied at the time of assembly. Thus, by way of examples illustrated in FIG. 7, a tubular sealing element, which is a continuous, ring-shaped member having portions 1 and 2 integrated together, is provided with a valve 3 through which the required internal pressure can be provided in the interior of the tubular sealing element. Thus, this endless tubular system can be filled with a pressure medium, which may be gas or liquid, following the closure of the sleeve. The inner walls of the tube are protected from permeation by providing a special coating. The pressure medium can be pumped into the tube by a handpump or a supply cartridge. The supply cartridge can remain attached to a flange and can be used for a refill in the event of a pressure loss.

Whereas the pressure control in the exemplary embodiment of FIG. 7 is achieved by an appropriate supply of pressure medium, another modification is illustrated in FIG. 8 in which no supply of the pressure medium is necessary. The pressure increase is achieved by compressing a container 4, which is permanently connected to the closed pressure system of the tubular sealing system having the continuously connected portions 1 and 2. In this case, the tube is filled with an unpressurized fashion with a pressure medium of gas or liquid. When the sleeve has been closed, necessary pressure is obtained by compressing the container 4 as will be explained later with regard to the embodiment of FIG. 11.

As mentioned above, the cross sectional shape of the sealing element for the sealing portions 1 and 2 can have various shapes. In an embodiment illustrated in FIG. 9, it has a hollow, rectangular shape with the walls of the square or rectangular shape, particularly the lateral walls 1e and 2e, being concave walls having inwardly extending depressions so that when the tube is compressed in a vertical direction, which is the preferred direction of collapse, the wall 1e or 2e collapsed into the interior 1d or 2d when the compression pressure exceeds a limited value which is governed by the shape and the material. When applying this compression, the tube will support the pressure because of the elastic material properties and when the forementioned limit value is reached, the pipe or tube will collapse inwardly until it is finally completely compressed. Thereafter, the compression is governed only by the elasticity of the material. This design is particularly favorable for sealing elements and sealing zones of cable joints since the profile is combined with the elastic properties of material and can be constructed to be such that the pressure in the sealing system firstly increases in a linear fashion until the necessary closing pressure is reached. During the next portion of the closing stroke which occur, for example, when closing elements are screwed further, the pressure in the sealing system will remain virtually the same. This means that the closing element need be designed only for this necessary closing pressure. It is thus impossible for the permitted value for the closing element to be widely exceeded and therefore, there is adequate protection from overloads and from damage. Furthermore, in this sealing profile, an opening or aperture 1f or 2f can be formed as an inlet in one of the walls facing towards the interior of the cable joint. Thus, with these openings 1f or 2f, any excess pressure prevailing, for example, in the sleeve can be utilized or exploited in the sealing system so that additional excess pressure will prevail and the sealing system will serve as a backup in the sealing system in the described sense.

Figure 9:
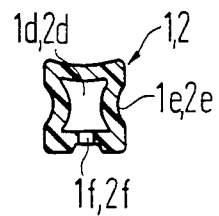
FIG. 9 is a cross sectional view of a portion of the sealing system in accordance with the present invention illustrating another cross-sectional configuration.
Figure 10:
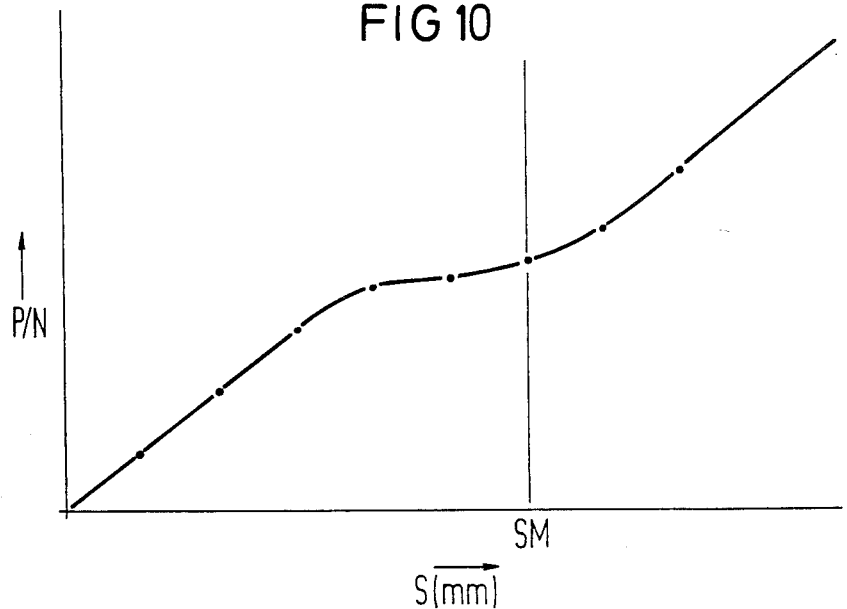
FIG. 10 is a graph illustrating the relationship of pressure on the sealing portion, such as illustrated in FIG. 9, relative to distance of displacement.

An elastic characteristic of this kind is also represented in the graph of FIG. 10 wherein the pressure P versus the closing stroke S are plotted for the element of FIG. 9. The first section of the curve has a linearly, increasing characteristic in that an increasing closing stroke or distance occurs almost exclusively from the elastic property of the material used for the sealing element. After the first bend in the curve, the collapse of the laterally indented or concave walls 1e and 2e of the sealing portions 1 and 2 in FIG. 9 will start. Here, the closing pressure remains virtually uniform and the height of this section is adjusted to be such that it will correspond precisely to the necessary closing pressure. When the closing stroke S is reached when the closing elements are further clamped, the closing pressure does not raise within a wide range. As a result, the tolerance range can be extended so as to virtually avoid the damage of overloading the sealing element providing the closing stroke is not increase beyond the second bend SM of the curve. This, however, can be prevented by suitable measures and limitations. If no limitation occurs following the second band SM, the normal compression is restored, which is governed solely by the material used for the sealing element or forming the portions 1 and 2.

In using a sealing system, such as illustrated in FIG. 8, having the container 4, the joint will have the construction at one of the end bodies 7 as illustrated in FIG. 11. As illustrated, the sleeve 8(2a) has a groove for holding at least the annular portion 1 of the seal against the periphery of the end body 7. A container 4 is in the fluid communication with the interior of the tubular member and is pressed by a cap 5 which is secured on the outer surface of the body 7 by screws 6. To increase the internal pressure of the fluid in the tubular member forming the portions 1 and 2, the pressing of the container 4 between the cap 5 and the end surface of the end bodies 7 will cause a uniform pressure in the hollow, tubular sealing system to cause a uniform pressing against the various sealing surfaces. The dimensions of the cap 5 are such that when it forms a stable contact with the appropriate shaped end wall of the body 7, an adequate sealing pressure is achieved. In contrast, by detaching the cap 5 by means of loosening the screws 6, the container 4 can be released and the fluid pressure in the interior of the sealing system will be decreased so that the sleeve 8(2a) can be reopened without exerting much force. The advantages of the sealing system, which operates indirectly through an internal pressure in the sealing element or portions, has special advantages since it offers uniform distribution of pressure, ease of opening and closing of the sleeve with a pressureless tube and the simple facility of varying the pressure of the seal and thus, compensating for production tolerances.

Figure 14:
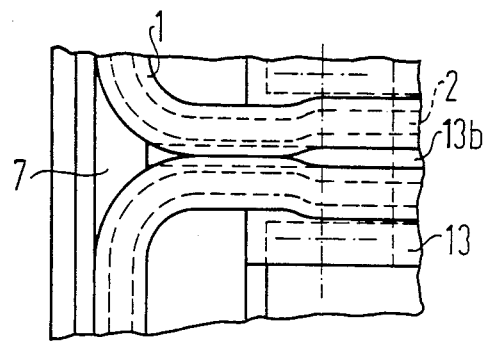
FIG. 14 is a partial plan view of an end body and a connecting bar utilized in the system illustrated in FIG. 12 with the sealing system installed thereon.

In the embodiment of the cable joint 100 of FIG. 1, the annular portions 1 are carried in peripheral grooves of the end bodies 7 while the longitudinally extending portions 2 are carried on a annular bar or member 13. As best illustrated in FIGS. 12–16, the sealing system has two longitudinal portions 2 which extend between the two annular portions 1. The two longitudinal portions are each held in space relationship in grooves 13a of the connecting bar 13 and are spaced apart by a ridge or rib 13b. As illustrated in FIG. 14, the annular portions 1 are received in a peripheral groove in the end body 7. Preferably, the sealing element having the portions 1 and 2 is assembled in this manner. The sleeve 8 along each edge of the slot has two bead-like projections or flanges 8a and 8b wherein the projection 8a has a groove for receiving a longitudinally extending projection on the bead or flange 8b. The projection and groove have a wedge shape and for closure are compressed by means of one or more clamping bars, such as the clamping bar 43 illustrated in chain lines in FIG. 13. The sleeve 8 on an internal surface adjacent each of the edges has guide portions or members 8c which are arranged along the sealing zone so that when the sleeve 8 is closed, these will move behind the connecting bar 3 and provide a precise guidance. In the illustrated embodiment, the sealing element forming portions 1 and 2 is circular; however, this is not essential. The diameter of the element forming the portions 1 and 2 is selected to be such that the sealing portions project beyond the groove 13a of the connecting bar 13. However, the groove 13a is designed to be such that it contains sufficient bypass area for the later compressed seal while maintaining the necessary sealing pressure. The sealing element forming the portions 1 and 2 can either be pressure free or can be acted upon by an internal pressure.

To close the slot, as illustrated in FIG. 13, matching wedge-shaped closing bars 43 are utilized. The sleeve 8 has been contracted in the closure zone and longitudinal edges of the sleeve 8 have pressed the sealing portions 2 into the groove 13a of the connecting bar. Also, because the guide portions 8c engage the bar 13, an accurate positioning of the bar and sleeve will occur.

An endless sealing element will have corners of transition between the longitudinal portion 2 and the annular portion 1 which are illustrated in the zone Z of FIG. 1 and shown in greater deail in FIG. 14. The particular difficulties which will occur with these transition zones are described with regard to FIGS. 14–16.

As illustrated in FIG. 14, in the region of longitudinal portion 2 for the connecting bar 13, there is a bridge or ridge 13b which extends between the grooves 13a. At the zone or turning point Z (FIG. 1), the ridge 13b tapers and narrows to a portion 13b' best illustrated in FIG. 16 to form a gusset region. In this region, the two sealing portions 2 will merge together and into side by side engagement and as illustrated, to ensure that the gusset region is completely sealed in a longitudinal direction. The annular sealing portion 1 then continues in the continued deformation of the sealing portion along the periphery of the end body 7.

Figure 15:
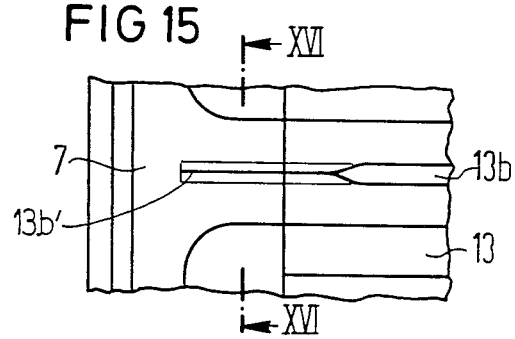
FIG. 15 is a partial plan view similar to FIG. 14 with the sealing system removed.
Figure 16:
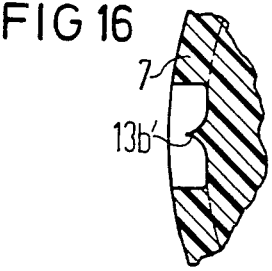
FIG. 16 is a partial cross sectional view taken along line XVI—XVI of FIG. 15.

The change in the structure of the bridge element 13b to the portion 13b' is best illustrated in FIGS. 15 and 16. As illustrated, the bridge 13b goes from a rectangular cross section to a wedge-shaped cross section having two curved surfaces. It is also noted, that a part of the portion 13b' is formed in the actual periphery of the end member 7. As illustrated in FIG. 15, the bar 13 forms a butt joint with an inner planar surface of the body 7. To ensure a good seal, the two portions 2 should be merged together prior to crossing this joint to ensure sealing the cable joint from the exterior.

Figure 17:
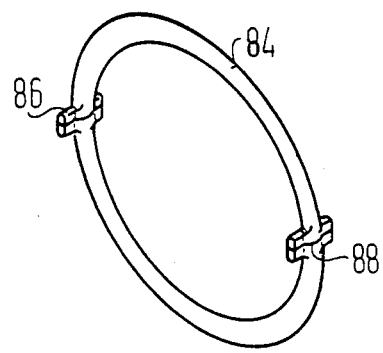
FIG. 17 is a perspective view of a split annular sealing portion in accordance with the present invention.

As mentioned with regard to the embodiment 100a of FIG. 2, the portions 1 can be separate portions from the longitudinally extending portions 2. When utilizing separate portions, they can be annular rings or they can be split annular rings, such as the split seal 84 of FIG. 17. The split seal 84 has two components which are matched in length and dimensions to the characteristics of the peripheral surface of the end body 7 or an inner peripheral surface of the sleeve if it is to be carried thereon. In order to ensure a simple and reliable guidance of these annular seals 84, the division 88 has a T-shaped end 86. Thus, in accordance with the division area Y of FIG. 2 of the end body 7, the overall annular seal 84 consists of a plurality of components which are inserted into the peripheral grooves of the end body 7. The T-shaped end 86 of the annular sealing component 84 is provided as an anchor in the sealing body and can be received in a transverse groove similar to a groove 87 formed in a separation plane between elements of the end body as illustrated in FIG. 7. Each of the components of the annular seal 84 is located with bias in the end body peripheral groove and, due to the anchorage in the transverse groove 87, cannot slide out. The T-shaped end 86 of the annular sealing component 84 are designed in such a manner that the round rear of the annular seal 84 continues to the division 88 and that when the sealing body components are screwed together, the T-shaped ends 86 are pressed against one another. When the split sleeve, such as 8(1), has been clamped around the end body 7, the annular seal 84 will be pressed onto the peripheral groove of the end body 7 and against the inner wall or surface of the sleeve until the desired sealing effect is achieved.

Figure 18:
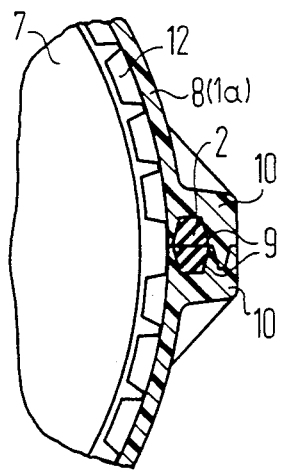
FIG. 18 is a partial transverse cross sectional view illustrating a longitudinal sealing portion of an embodiment similar to the embodiment of FIG. 2.
Figure 19:
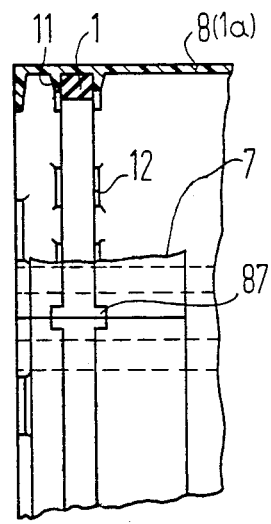
FIG. 19 is a longitudinal cross sectional view with portions broken away illustrating the annular sealing ring such as illustrated in FIG. 17.

In FIGS. 18 and 19, a sleeve 8(1a) is illustrated in the sealing zone of the junction between the longitudinal sealing portions 2 and the annular portion 1. The two straight longitudinal portions 2 of the sealing system of FIG. 18 are accommodated in longitudinal grooves 9 of flanges 10 of the sleeve 8(1a). The shape of the sealing grooves 9, and a sealing groove 11 on the sleeve 8(1a) matches the corresponding already described sealing forms. The two annular sealing portions 1 of the sealing system are accommodated in the annular grooves 11 located at the two joined ends of the sleeve 8(1a). These annular grooves 11 of the sleeve are arranged in the form of segments 12 along an inner periphery surface of the sleeve 8(1a) in order not to impair the elasticity required for the closure process and to allow wrapping and unwrapping of the sleeve around the end bodies 7. Thus, in the case of an endless seal, the two longitudinal portions 2 are inserted into the longitudinal grooves 9 of the flanges 10 of the sleeve 8(1a) where they are pressed against one another. Following the assembly and the closure of the sleeve 8(1a), the interior of the joint is closed off from the exterior so as to be pressure tight. The sealing system and the sealing grooves are adapted to one another in such a manner that having the sealing elements or portions pressed into the grooves, the portions remain sealed therein and cannot slide out. In this way, the sleeve 8(1a) and the required seal portions 1 and 2 can be supplied as a unit and assembled at the location of use. As illustrated in FIG. 19, the two transverse groove 87 which are in the division plane of the body 7 represent an extension of the sealing groove 11 and serve to anchor the split annular seal 84. In such an arrangement, the body 7 may be provided with a very shallow groove which coacts with the groove 11.

The closure means for holding the edges of the sleeves can take various configurations.

For example, a sleeve 8(3) of FIGS. 20 and 21 utilize a plurality of toggle closure devices having toggles 24 for clamping the pair of horizontal portions 2 in tight sealing engagement as the edges of the sleeve 8(3) are clamped together. The individual toggles 24, which have a self-locking device, are commercially available and are adapted to the conditions along the longitudinal slot. Thus, in any case, individual toggles 24 of this kind will be engaged in the region of the end bodies 7 to allow the clamping forces to act directly on the underlying annular seal portion 1 which is disposed between the periphery of the end body 7 and the sleeve 8(3). The clamping force upon the longitudinal seal portions 2 is transferred, for example, via two web plates 25 which are fastened by screws 26 to the exterior of the sleeve 8(3) as can be seen in FIGS. 20 and 21. These plates 25 act on the edges flanges of the sleeve 8(3).

In the arrangement illustrated in FIGS. 22-24, the closure means will require no special tools. Here again, the device consists of individual closing toggles 28, which are arranged in series with one another along a longitudinal slot of a sleeve 8(3a). These closing toggles 28 are provided with one or more than one insertion slot 29 (FIG. 22) and a tension wire 30 is hooked in the slots in order to clamp the closure device. As can be seen from FIG. 24, the tension wire 30 curves in a serpentine formation to provide hook portions interconnected by parallel wire portions to hook portions on the opposite side and with a number of hook portions corresponding to the number of closing toggles 28. The offset is such that one side are inserted into insertion slots 31 on the flanges of the sleeve 8(3a) and the offset on the other side are inserted into insertion slots 29 of the closing toggle element 28. When the closing toggle 28 has been pressed down, the tension wire 30 is tightened and provides the necessary closing pressure to the sealing system and the longitudinal seal of the sleeve 8(3a) and in the annular seal system as the sleeve 8(3a) is thus simultaneously clamped onto the end bodies 7. As illustrated in FIGS. 22 and 23, the toggle is mounted with a pin pivotally received on a portion of the opposite flange of the sleeve 8(3a) and has pivotal movement between a closed position, illustrated in bold lines in FIG. 22, to an open position, illustrated in broken lines in FIG. 22. When in the open position, the opposite offset portions will be released from the grooves 31, to release the seal portions 2.

Figure 26:
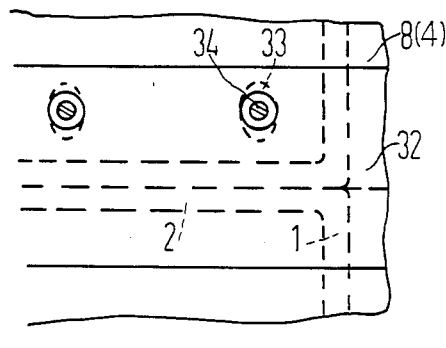
FIG. 26 is a partial plan view of the clamping arrangement of FIG. 25.
Figure 25:
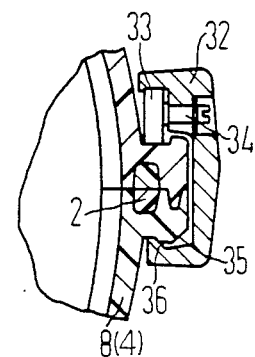
FIG. 25 is a transverse cross sectional view of a longitudinal sealing portion utilizing another clamping arrangement.

Instead of utilizing toggles for the closure elements, a closure bar 32 (FIGS. 25 and 26), which has parallel flanks and can be used for holding the flanges or beads of a sleeve 8(4) together. A longitudinal bead to the sleeve 8(4) is provided at the outer surface with longitudinally extending undercuts and to which an inwardly bent flank of the closing bar 32 is engaged. The clamping of the closure device comprising the bar 32 with the longitudinal bead is carried out by a plurality of eccentric cams 33 with axles 34 which cams are mounted at a short interval along the length of the bar 32. The cams are mounted in such a manner that they can engage an undercut on the other longitudinal bead when they are turned inward from the exterior in order to clamp the two beads together by the bar. By virtue of the eccentric design of the cams 33, the closing pressure along the longitudinal slot can be produced continuously by using a simple tool, for example, a screwdriver in the case of a slotted design of the rotational axles 34. As illustrated in FIG. 25, the longitudinal seal portions 2 are placed in longitudinal grooves in the edge flanges of the sleeve 8(4) and the edges also have a wedge-shaped projection received in the wedge-shaped groove to aid in their aligned during forming of the closure. As illustrated in FIG. 26, the eccentrically designed cams 33 have an oval shape so that a double stroke is produced on rotation around their axle 34. For this purpose, the end of the axles 34 are slotted to receive a screwdriver. However, they can be provided with a square, or hexagonal head or socket. To simplify the assembly of the closing bar 34, the flange opposite to the one engaged by the cams 33 is provided with inlet bevels 35 and 36. Here again, the sealing portions 2 of FIG. 25 are illustrated as being solid elements.

Figure 28:
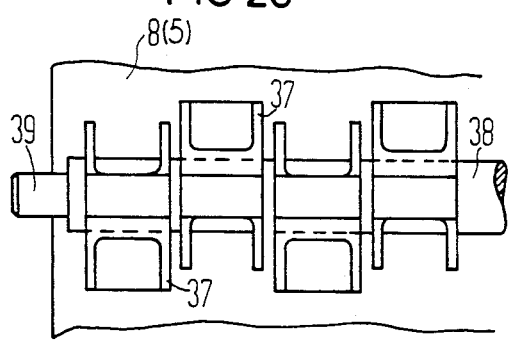
FIG. 28 is a partial plan view of the clamping arrangement of FIG. 27.
Figure 27:
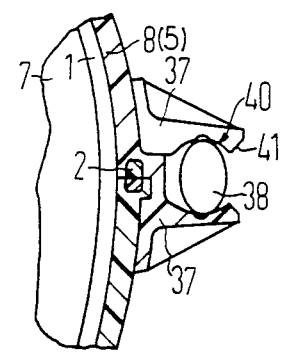
FIG. 27 is a transverse cross sectional view of a longitudinal sealing portion illustrating another modification of a clamping arrangement.

In an embodiment of the closure which is illustrated in FIGS. 27 and 28, a sleeve 8(5) has alternately arranged flange portions 37 which overlap adjacent edge portions of the sleeve 8(5). The projecting end of the overlapping longitudinal flanges 37 is designed to have a concave face and the concave faces coact to produce a locking groove 40 extending in the longitudinal direction. A rod 38 can now be engaged in this lock-in groove 40 along the entire length of the slot. However, the diameter of the rod 38 must be such that the longitudinal flanges 37 can be moved apart until a longitudinal edges of the sleeve 8(5) are compressed in a sealed fashion onto the inserted sealing system portions 2. Inlet bevels 41 on an edge of each of the longitudinal flanges 37 simplify the insertion of the closing rod 38. An improvement as represented in FIGS. 27 and 28 provide the closing rod 38 with an oval cross section with a narrow axis and a major axis. In this way, the closing rod 38 is introduced into the groove 40 with its major axis extending radially relative to the axis of the sleeve 8(5). Then, the rod is rotated 90° to place the major axis to extend between the surfaces of the grooves 40 and to provide the closing pressure on the sealing system. As best illustrated in FIG. 28, the flanges 37 are alternately overlapping from opposite sides of the sleeve 8(5). The closing rod 38 extends parallel to the longitudinal direction and can be shaped preferably at an end 39 to enable rotation by means of a simple tool.

Figure 30:
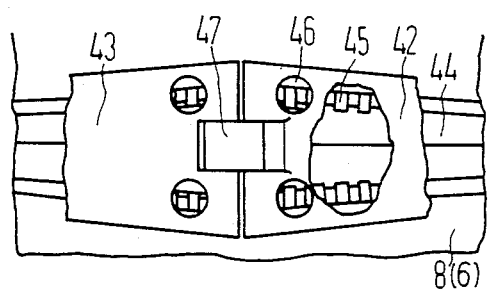
FIG. 30 is a plan view with portions broken away for purposes of illustration of the clamping arrangement of FIG. 29.
Figure 29:
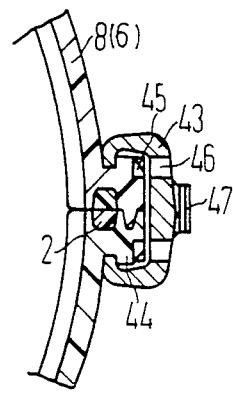
FIG. 29 is a partial transverse cross sectional view illustrating yet another modification of the clamping arrangement for the longitudinal sealing portion.
Figure 31:
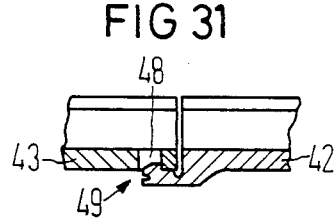
FIG. 31 is a longitudinal cross sectional view of the clamping arrangement of FIG. 30.

The closure devices or means for the cable joint can comprise tapering connecting bars 42 and 43 which coact with tapering closing flanges 44 that extend along the longitudinal slot of a sleeve 8(6) (FIG. 30). The tapering flanges taper from a narrow portion adjacent each end to a wider portion at the center and the elements 43 also have this tapering condition so that when the two elements 43 and 42 are drawn together they apply a closing pressure on the flanges 44 and any seal portions 2 disposed therebetween. As best seen from FIG. 30, the two closing bars 42 and 43 are provided for the closure of the sleeve 8(6) and are laterally positioned on the corresponding longitudinally tapering flanges 44. In the region of the sleeve center, these longitudinal flanges contain radial recesses 45 which are arranged in series. Through openings 46 in the closing bars 42 and 43, these closing bars can be moved in a longitudinal direction by a levering movement, for example, by using a screwdriver inserted through the opening and engages in a recess 45. During the closing of the sleeve, the two closing bars 42 and 43, which have been drawn towards one another are locked by means of a rachet lever 47, which is arranged on the closing bar 42 and engages into a corresponding recess or aperture 48 as illustrated in FIG. 31. The rachet lever or hook element 47 can be unlocked by being lifted by a screwdriver inserted in the groove, such as 49, whereupon the wedge-shaped bars 42 and 43 are released by again inserting a screwdriver through the above mentioned apertures 46 to engage a recess 45 and apply leverage to move the bars.

In the previously described closure system, two horizontal portions 2 are utilized. In the system illustrated in FIGS. 32-37, only a single horizontal portion is provided. Thus, like the arrangement of FIG. 2, the annular portions 1 are separate from the horizontal portion 2. However, they are arranged so that in the area of the two end bodies 7, the annular portions 1 intersect the single, horizontal portion provided by the single seal 63. This point of intersection is shown by the zone W in FIG. 2. Special provisions must be made for this purpose in order to adhere to the necessary closing conditions. On the whole, any system in accordance with the invention can be used for the annular seal portions 1 which can be designed to be self-closed or split rings.

Figure 32:
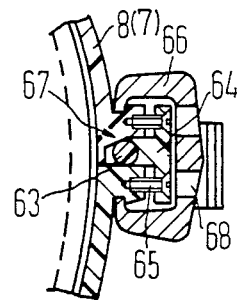
FIG. 32 is a partial cross sectional view illustrating a still further modification of the clamping arrangement for the longitudinal seal.

In the embodiment of FIG. 32, a cross sectional view of a longitudinal closure device represents an arrangement of this longtidunal seal 63 which follows the application of a tapering closing bar 66 and is pressed by means of a pressure strip 64 and the securing screws 65 thereof into a longtidunal groove 67 which is formed in a longitudinal flange of a sleeve 8(7). Due to the bevel of the longitudinal groove in the upper longitudinal flange of the sleeve 8(7), the longitudinal seal 63 is also pressed against the flat surface of the underlying longitudinal flange. In this way, the desired compression of the seal 63 is achieved with the pressure strip 64 firmly screwed into the position. For example, until after the closing bar 66 has been applied, the pressure strips 64 may be in a loosely received position without applying pressure on the seal 63. Subsequent to applying the bars 66, the screws are then tightened by inserting a screwdriver through the bore 68 to move the pressure strips 64 to a position to apply pressure on the seal 63. This will have the advantage, that the pressure for forming the seal between the flanges and 63 is not done until after the bar 66 is applied.

Figure 33:
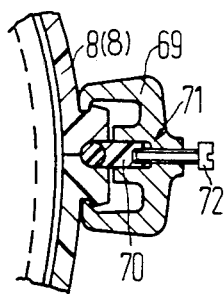
FIG. 33 is a transverse cross sectional view illustrating yet another modification of the clamping arrangement and longitudinal seal.

An embodiment or modification of this arrangement is illustrated in FIG. 33. A sealing or pressure bar 70 has been integrated into two tapering closing bars 69 which have a longitudinally extending groove 71 for receiving the pressure strips 70. Additionally, screws 72 are provided for applying or exerting pressure on the strip 70. This is a variation which provides greater ease of assembly in comparison to the embodiment of FIG. 32 because the necessary components are preassembled. By tightening a screw 72 after the mounting of the closing bar 69, the inserted longitudinal seal 63 is then compressed in a sealing groove formed in the longitudinal flanges of a sleeve 8(8).

Another embodiment is illustrated in FIGS. 34-37. In this embodiment, an annular seal 60 is carried by the end bodies 7 with the longitudinal seal 63 being arranged as in the two embodiments illustrated in FIGS. 32 and 33. Thus, as shown in FIG. 36, a groove base 74 of the upper longitudinal flange is opened in this intersecting zone so that at this intersecting zone the annular seal 60 and the longitudinal seal 63 can contact one another. The so-called gusset, which is formed in this contact zone, can, in some cases, also be filled with a locally applied permanently plastic bonding compound. For the sealing of this gusset, an inner sealing lip 75 of each of the two longitudinal flanges of the sleeve 8(9) taper in to form blades (see FIG. 34). In the region of the annular seal 60, the longitudinal seal 63 is deflected out of the inner contour of the longitudinal flange by an appropriately shaped spring or pressue element 73 of a pressure strip 64' so that the two sealing portions are compressed at the point of intersection. As illustrated in FIG. 37, the end of the pressure strip 64' with the projecting spring or portion 73 will effect the deflection of the longitudinal seal 63. This deflection can also be seen in FIG. 36 in which the portion of the longitudinal seal 63 in the remaining region of the longitudinal slot has been indicated in broken lines. This ensures that a reliable seal of the gusset zone is also obtained at the intersection point of the two sealing element portions.

As illustrated in FIG. 3, the system 100b has the sealing portions 1 and 2 carried on the sleeve 8(2). Preferably, the portions 1 and 2 are also integral so that they are formed by a single, continuous loop element. As best illustrated in FIG. 38, the sleeve 8(2) has the annular portions 1 received in the annular grooves formed by segments 12 of the sleeve 8(2) so that when the sleeve 8(2) is closed, the portions 1 will be pressed onto the peripheral surface of the end body 7. The longitudinal portions 2 are secured at the longitudinal edges of the sleeve 8(2) in grooves formed in edge flanges 12'. Following the assembly of the end bodies and the connecting bar 13(1), the sleeve 8(2) is mounted in such a manner that the two longitudinal seal portions 2 are arranged opposite the connecting bar 13(1). Here, the connecting bar 13(1) contains a recess 13c which leaves a space adjacent the recesses or grooves in the flanges 12' of the sleeve 8(2) to automatically produce a mutual alignment. During the closure of the sleeve 8(2) with the aid of a closing bar, the two longitudinal edges are drawn towards one another whereby the seal portions 2 attach themselves in a sealing fashion onto the closing bar 13(1). As already explained with reference to FIGS. 14–16, the closing bar 13(1) is provided with corresponding recesses in order to be reliably sealed, the gusset zones which is formed at the junction of the portions 1 and 2.

Figure 39:
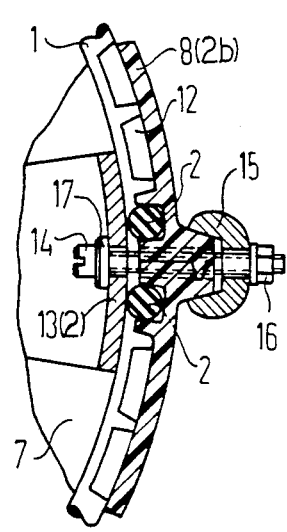
FIG. 39 is a transverse cross sectional view similar to FIG. 38 of a modification of the arrangement of FIG. 38.

A modification of the arrangement of FIG. 38 is illustrated in FIG. 39 wherein the longitudinal seal portions 2 are again pressed by a sleeve 8(2b) onto a connecting bar 13(2) which is located in the interior of the cable joint. Connecting bar 13(2) is firmly secured by lateral surfaces following the assembly of the cable in the end bodies 7. In order to avoid a different longitudinal expansion in the event of temperature changes, the connecting bar 13(2) likewise consists, for example, of a synthetic material. In this examplary embodiment, threaded bolts 14 are secured into the connecting bar 13(2) at short intervals in series with one another and extend outwardly through correspondingly free-half bores in the two longitudinal flanges of the sleeve 8(2b) and through a flange bar 15. The flange bar 15 is then tightened by a corresponding nut 16 against the longitudinal flanges of the sleeve 8(2b) so that the two longitudinal flanges of the sleeve 8(2b) are pressed onto one another and the connecting bar 13(2) is pressed against the two longitudinal seal portions 2. This prevents the connecting bar 13(2) from yielding due to inadequate rigidity of shape. This double-sided bevel of the two longitudinal flanges of the sleeve 8(2b) and of the flange bar 15 facilitate the positioning of the flange bar 15 and permit the double-sided pressure of the longitudinal flanges towards one another. The threaded bolts 14 are sealed from the exterior by an elastomer disk 17. Also, indicated in the background in the annular seal 1 which is fixed in an annular groove formed by segments 12 of the sleeve 8(2b).

Figure 40:
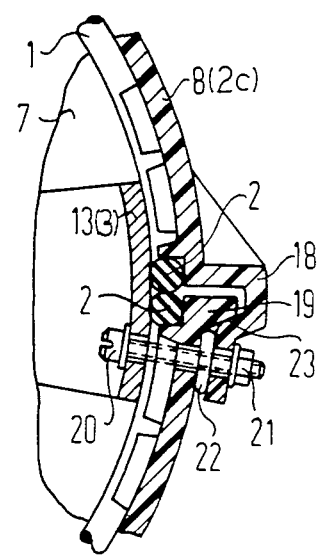
FIG. 40 is a transverse cross sectional view similar to 38 of another modification of the embodiment of FIG. 38.

Another modification or alternate construction is illustrated in FIG. 40. Here, in addition to being pressed onto a connecting bar 13(3), the two longitudinal seal portions 2 are also pressed against one another thus increasing the sealing effect. A longitudinal flange 18 of the sleeve 8(2c) has a hook shape and overlaps a second projecting longitudinal flange 19. The lower longitudinal flange 19 is placed on a threaded bolt 20 which is screwed into the connecting bar 13(3) and is covered by the upper longitudinal flange 18 through which the bolt 20 likewise projects. The necessary sealing pressure is produced by means of a hexagonal nut 21 and the screw bore is again sealed by an elastomer disk 22 positioned between the two longitudinal flanges. An inlet bevel 23 on the inner longitudinal flange 19 facilitates the overlap of the two longitudinal flanges and also permit the two longitudinal seal portions 2 to be pressed onto one another.

Figure 41:
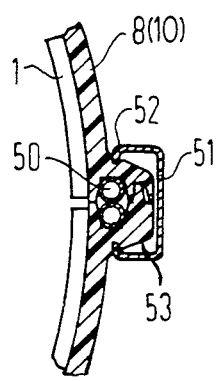
FIG. 41 is a transverse cross sectional view of another embodiment of the longitudinal sealing portion in an inflated condition.
Figure 42:
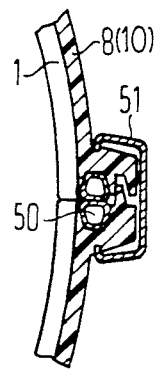
FIG. 42 is a cross sectional view of the embodiment of FIG. 41 with the horizontal portion being inflated into a sealing engagement.

As mentioned here and before, when utilizing sealing systems, such as a tubular system of FIGS. 7 and 8, an indirect sealing force can be applied. In this arrangement, the closure system is more or less slackly assembled and the necessary sealing pressure is finally produced by pressure medium inside of the tubular sealing system. As illustrated in FIG. 41, a longitudinal seal of a sleeve 8(10) is initially not subjected to closing pressure because it has a tubular sealing element 50 inserted into a longitudinally extending sealing groove. The two longitudinally extending sealing flanges of the sleeve 8(10) are held together by a closing bar 51 wherein the groove and projection combinations serve to align the longitudinal flanges. The application and locking of the closing bar 51 is facilitated by bevels 53 along the longitudinal flanges so that the closing bar 51 can be locked in position by being pressed down into externally located grooves 52. Following the simple positioning and fixing of the longitudinal flanges, the previously pressureless tubular seal 50 is now expanded by a pressure medium which is applied by either method described hereinbefore. This pressure medium provides the necessary closing pressure to be built up by the formation of the internal pressure. As illustrated in FIG. 42, the final state is achieved wherein the tubular seals 50 entirely fill the groove areas and in some cases, even deform the connecting bar 51 until it strikes against the longitudinal flange surface. In a closure system of this type, no longitudinal connecting bars are required for the sealing purpose so that the position of the longitudinal closing device is noncritical.

Figure 43:
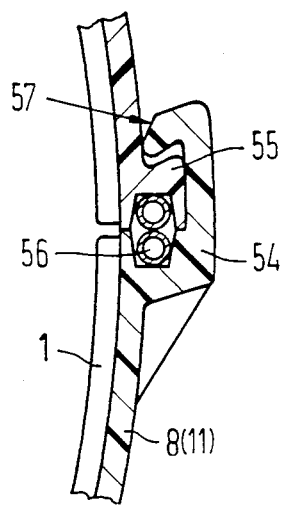
FIG. 43 is another transverse cross sectional view of the inflatable longitudinal sealing element in an uninflated condition.
Figure 44:
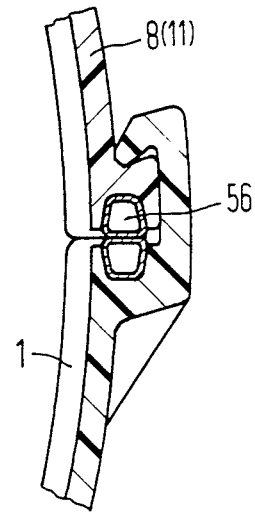
FIG. 44 is a transverse cross sectional view of the embodiment of FIG. 43 in the inflated condition.

A modification of this system is illustrated in FIGS. 43 and 44 wherein the longitudinal section of the sealing zone of the cable joint is obtained without the addition of the closing component. In this modification, the lower longitudinal flange 54 of a sleeve 8(11) is hooked-shaped and overlaps an upper longitudinal flange 55. The flanges 54 and 55 have facing grooves which receive the longitudinal portion of the tubular seal 56. With the tubular seal inserted, the longitudinal flange 54 is moved across the longitudinal flange 55 and the assembly is facilitated by the provision of a bevel 57. After forming the assembly, the tubular system has a pressure medium inserted to the interior until necessary closure pressure has been produced (see FIG. 44). This compression also serves to achieve the necessary mechanical hooking engagement of the closure system.

Figure 45:
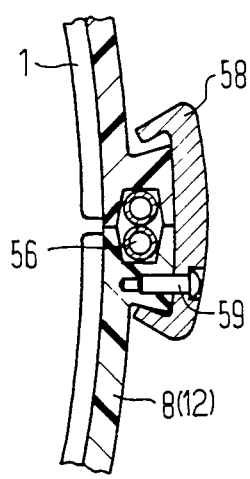
FIG. 45 is a third embodiment of an inflatable longitudinal cross sectional sealing portion in an uninflated condition.
Figure 46:
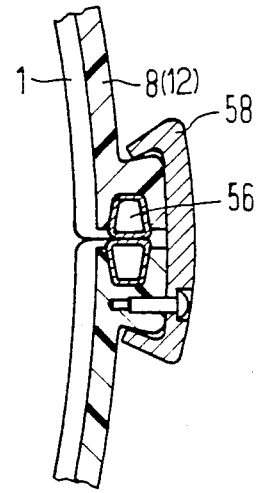
FIG. 46 is a transverse cross sectional view of the embodiment of FIG. 45 in the inflated condition.

Another modification utilizing an internal pressure system is illustrated in FIGS. 45 and 46. In order to simplify the molding tools for the production of a sleeve, a sleeve 8(12) is utilized. In the hook-shaped formation of the flanges corresponding to the flanges of 54 is provided by a U-shaped bar 58. The bar 58 is attached to a lower part of the sleeve 8(12) by a fastener 59. The assembly is accomplished with no internal pressure in the tubular seal 56 and after assembly, a pressure medium is inserted in the tubes 56 to expand them to the condition illustrated in FIG. 46 to form the seal therebetween.

Figure 47:
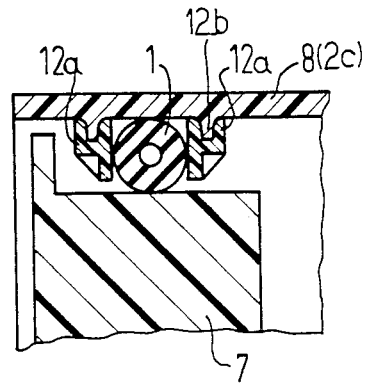
FIG. 47 is a partial longitudinal cross sectional view of an embodiment of an annular portion taken along line XLVII—XLVII of FIG. 3.

As mentioned hereinabove, problems with provided peripheral sealing grooves on an inner surface of a sleeve in the region of the end bodies 7 for receiving the annular sealing portion 1 occur. On the one hand, the sealing groove is to serve to fix the annular sealing portion 1 and on the other hand, flexibility of the sleeve should not be impaired by a peripheral groove of this type. It is particularly difficult to manufacture a sleeve with integral peripheral groove since the removal of the sleeve from the mold presents particular complications. Thus, it is expedient to provide separate elements which can be subsequently attached to the sleeve by bonding, insertion or clamping. Such elements 12a are illustrated in cross section in FIG. 47 and are secured on a sleeve 8(2c).

Figure 48:
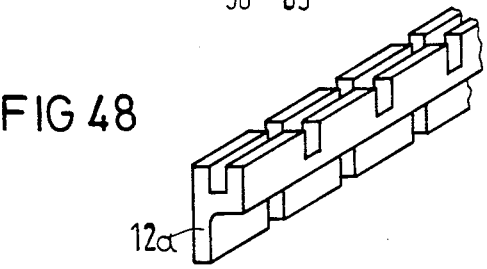
FIG. 48 is a perspective view of an element used in the embodiment illustrated in FIG. 47.

As illustrated in FIG. 48, the groove elements 12a which is the elongated form are arranged in series as a strip and can be maintained flexible by transverse slots or indentations. These strip-like structures are then easily positioned onto projections 12b formed on the inner portion of sleeve 8(2c).

Figure 49:
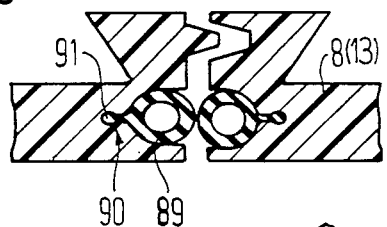
FIG. 49 is a cross sectional view of another modification of sealing portions in accordance with the present invention.

In order to fix a tubular seal 89 in a sleeve, such as the sleeve 8(13) of FIG. 49, a groove in a longitudinal flange of the sleeve 8(13) is provided with a longitudinally extending groove 90 into which a bracket strip 91 which is laterally molded into a sealing element 89 is inserted in a shape locking fashion. This design of a tubular sealing element can be applied to all of the previously described embodiments and therefore, further explanation is unnecessary.

Preferably, the tubular sealing element 89 is of the kind consisting of a special rubber mixture corresponding to the prerequisite elasticity and permitted permeation. The endless sealing elements are preferably filled with a gas subject to a slight overpressure. The compressible gas filling of the sealing element of this kind provides an all-around uniform pressure and thus permits the compensation of the production tolerances in respect to cross sectional constrictions of the sealing groove and the like. When the sleeve 8(13) is closed by means of a tapered closing bar, as has been described several times, the gas pressure in the tubular sealing element which pressure required for sealing of a maximum of 0.7 bar inner pressure, is produced by pressing the closing bars against one another and onto an end body.

Although various minor modifications may be suggested by those versed in the art, it should be understood that we wish to employ within the scope of the patent granted hereon, all such modifications as reasonably and properly come within the scope of our contribution to the art.

We claim:

1. In a cable joint having a pair of end bodies with sealing glands for cables extending therethrough and a sleeve having a longitudinally extending slot with two edge portions, said sleeve being wrapped around the spaced apart end bodies and held there by a closing means engaging said sleeve, the improvements comprising an internal member extending between a periphery of one end body and a periphery of the other end body and being adjacent said slot, and a sealing system having a single, continuous endless ring sealing element having two longitudinal sealing portions and two annular sealing portions, said sealing element being positioned with an annular portion being disposed between a periphery of each end body and the sleeve and the two longitudinal sealing portions being positioned between the internal member and the two edge portions of the sleeve, means for holding the member and edge portion in a clamped engagement on the longitudinal portions of the sealing system to seal the slot, said sealing element being of an elastic material constructed to be sufficiently flexible so that the closing means and closing elements can be constructed as simple as possible and can be actuated by utilizing conventional tools for obtaining the necessary closing pressure.

2. In a cable joint according to claim 1, wherein the endless ring sealing element has a solid cross section.

3. In a cable joint according to claim 2, wherein the endless ring sealing element has at least one lip extending the length of said ring.

4. In a cable joint according to claim 1, wherein the endless ring sealing element is provided with a bonding agent.

5. In a cable joint according to claim 1, wherein the endless ring sealing element has a tubular cross section.

6. In a cable joint according to claim 5, wherein the tubular sealing element forming the ring has an approximately rectangular basic cross section, with two side walls being concave side walls so that when the sealing element is compressed, a preferred bending direction is obtained.

7. In a cable joint according to claim 6, wherein the tubular sealing element has at least one opening directed into the interior of the cable joint to enable transfer of pressure from the tubular sealing element and the interior of the cable joint.

8. In a cable joint according to claim 6, wherein the walls of the rectangular cross section are selected so that during compression of the sealing element, it exhibits a spring characteristic with a linear pressure rise and then has a substantially uniform pressure characteristic during further collapsing of the element up to a maximum closing pressure.

9. In a cable joint according to claim 5, wherein the interior of the tubular sealing element is subjectable to an excess in pressure.

10. In a cable joint according to claim 9, wherein the sealing element includes a valve for regulating the pressure in the tubular sealing element.

11. In a cable joint according to claim 9, wherein the tubular sealing element is connected to a compressible container.

12. In a cable joint according to claim 1, wherein the endless ring sealing element is provided with an impermeable coating.

13. In a cable sleeve according to claim 1, wherein at least one of the internal member, end bodies and the sleeve has a groove for receiving a portion of the sealing element.

14. In a cable joint according to claim 1, wherein the internal member is a connecting bar extending between the end bodies, said connecting bar having grooves for supporting the longitudinal portion with a ridge disposed between the two grooves, said grooves adjacent each end body merging together so that the longitudinal portions are held apart by the ridge along the slot and merge into sealing engagement with each other at each end body and adjacent the annular portion.

15. In a cable joint according to claim 1, wherein the means for holding comprises a split flange adjacent each of the edge portions of the sleeve, a matching clutch bar for engaging the surface of the split flange and pressing them close together, and means extending from said clutch bar to hold the internal member to press the longitudinal portions of the sealing system against the inner surface of the sleeve adjacent said flanges to form said seal.

16. In a cable joint according to claim 1, wherein the means for holding includes the sleeve having sub-flanges with one sub-flange having a hook portion for engaging the other sub-flange and bolt means extending from said hook portion to engage the inner member to hold the longitudinal portions of the sealing system tightly against an interior surface of the sleeve adjacent each of said flanges.

17. In a cable joint according to claim 1, wherein edge portions of said sleeve have flanges with one of the flanges having a longitudinally extending groove receiving a longitudinally extending projection of the other flange.

18. In a cable joint according to claim 1, wherein the annular and longitudinal sealing portions are carried on an inner surface of the sleeve.

19. In a cable joint according to claim 18, wherein the annular portions are received in an annular groove formed by a plurality of circumferentially spaced segments on the inner surface of said sleeve.

20. In a cable joint according to claim 18, wherein the annular portions are received in an annular groove formed by a pair of flexible elements secured to an inner surface of the sleeve.

21. In a cable joint according to claim 1, wherein the annular portions of the sealing system are carried on the end bodies and the longitudinal portions of the sealing system are supported and carried on the internal member to engage an inner wall surface of the sleeve adjacent said slot.

22. In a cable joint according to claim 1, wherein each of the end bodies and said internal member have means for holding the sealing element in position.

23. In a cable joint according to claim 1, wherein said sleeve has means at the edge portion and at each end for holding the sealing element in position.

* * * * *